United States Patent [19]

Yamazaki et al.

[11] 4,206,299

[45] Jun. 3, 1980

[54] ADHESIVE COMPOSITION

[75] Inventors: Kyuya Yamazaki, Takatsuki; Sachio Igarashi, Suita, both of Japan

[73] Assignee: Takeda Chemical Industries, Ltd., Osaka, Japan

[21] Appl. No.: 22,561

[22] Filed: Feb. 12, 1979

[30] Foreign Application Priority Data

Dec. 27, 1978 [JP] Japan ................................ 53-159178

[51] Int. Cl.² ............................................... C08G 63/68
[52] U.S. Cl. ..................................... 528/288; 525/437; 525/438; 525/440; 525/446; 528/26; 528/28; 528/32; 528/38; 528/297
[58] Field of Search ....................... 528/26, 28, 32, 38, 528/288, 297; 525/437, 438, 440, 446

[56] References Cited

U.S. PATENT DOCUMENTS

| | | | |
|---|---|---|---|
| 3,044,979 | 7/1962 | Saville | 525/474 X |
| 3,448,072 | 6/1969 | Ashby | 528/288 X |
| 3,658,939 | 4/1972 | Carpenter et al. | 528/288 X |
| 3,740,254 | 6/1973 | Lansbury et al. | 528/288 X |
| 4,009,312 | 2/1977 | Hayashi et al. | 525/437 X |
| 4,138,527 | 2/1979 | Malek | 528/288 X |

*Primary Examiner*—Lucille M. Phynes
*Attorney, Agent, or Firm*—Wenderoth, Lind & Ponack

[57] ABSTRACT

An adhesive composition for plastic-metal foil composite packaging materials which comprises (A) a polyester glycol having a molecular weight of 3,000 to 100,000, a polyester-polyurethane polyol having a molecular weight of 3,000 to 100,000 or a mixture thereof, (B) a silane coupling agent and (C) an organic polyisocyanate, the molar equivalent ratio (NCO/H) of isocyanate group (NCO) to active hydrogen (H) thereof being within the range of 1 to 10.

The adhesive composition provides a satisfactory packaging material which does not have the problem of delamination between the metal foil and plastic film even on hot-water sterilization as it contains foods in sealed relation and which ensures long shelf lives and an improved tolerance for foodstuffs.

7 Claims, No Drawings

ADHESIVE COMPOSITION

DESCRIPTION

Technical Field

This invention relates to an adhesive composition for packaging materials.

Background Art

Recently, as packaging materials for foodstuffs, etc., there has been developed, and in broad usage, a multilayer composite film consisting of a plastic film, such as polyethylene, polypropylene, nylon, polyethylene terephthalate or other film and a metal foil as laminated together in a plurality of layers. Many packaged foods are so packaged for the purpose of extending their shelflives and, in the manufacture of such a packaged food, the filling of the foodstuff into the packaging material must be followed by a high-temperature sterilization treatment which is conducted in boiling water or otherwise at an elevated temperature as high as 135° C., with the container having been tightly closed.

Joining of a plastic film with a metal foil has been conventionally accomplished with the use of a polyester urethane-epoxy resin adhesive comprising (1) a linear saturated polyester having at least one terminal hydroxyl group and having a molecular weight of not less than 10,000, (2) an organic polyisocyanate having at least two active isocyanate groups and (3) an epoxy resin having at least one hydroxyl group and at least one terminal epoxy ring, where the molar equivalent ratio of NCO/OH is 1.5 to 9.

However, when the packaging material fabricated with such an adhesive agent is sterilized at an elevated temperature, several objectionable effects are encountered. Thus, such a treatment not only reduces the strength of the packaging material but, in extreme cases, causes a complete delamination, with the resultant formation of pin-holes through the metal foil, reducing the inherent air-barrier properties of the metal foil and, hence, penalizing the object of extending the shelf-lives of foodstuffs. Furthermore, depending on the type of foodstuff, even if no reduction in bond strength is apparent immediately following the high-temperature sterilization treatment, the bond strength drops progressively in the course of prolonged storage, resulting in a delamination of the plastic film from the metal foil.

On the other hand, a composition comprising (1) an epoxy silane of formula $R^1Si(OR^2)_3$ (where $R^1$ is an organic group having at least one epoxy group and $R^2$ is monovalent saturated hydrocarbyl), (2) a titanic acid ester of formula $Ti(OR^3)_4$ (where $R^3$ is an organic group) and (3) an organic solvent has been proposed as a primer for a room temperature-setting polyurethane resin because of its excellent adhesion between an inorganic material and the polyurethane resin.

According to the aforesaid method, the primer comprising an epoxy silane is coated on the inorganic material, the organic solvent is evaporated and the room temperature-setting polyurethane resin as a top coat is applied on the dried surface of the primer.

The primer provides good adhesion to the surface of the inorganic material and a void-free layer on the substrate.

Thus, in the field of polyurethane coatings, a "primer" has been used for serving to bond a top coat to a substrate, but the "primer" has never been used in a state of a mixture with the top coat.

The intensive research undertaken by the present inventors for overcoming the disadvantages of the aforementioned polyester urethane-epoxy resin adhesive for plastic-metal foil composite packaging materials showed that a composition comprised of a polyester glycol or polyester-polyurethane polyol, an organic polyisocyanate and a silane coupling agent such as an epoxy silane is very advantageous in that the bond strength is not affected by the high-temperature or boiling-water sterilization treatment or during prolonged storage with foodstuffs contained therein, not to speak of the excellent resistance of the packaging material to oils, acids and foodstuffs. The above finding was followed by further research which has resulted in the present invention.

Disclosure of Invention

This invention is therefore directed to an adhesive composition for plastic-metal foil composite packaging materials which contains (A) a polyester glycol having a molecular weight of 3,000 to 100,000, a polyester-polyurethane polyol having a molecular weight of 3,000 to 100,000 or a mixture thereof, (B) a silane coupling agent and (C) an organic polyisocyanate, the isocyanate group/active hydrogen ratio (NCO/H) thereof being within the range of 1 through 10.

As examples of the polyester glycol used as component (A), there may be mentioned linear polyester glycols each having hydroxyl groups at both terminals and having a molecular weight of 3,000 to 100,000, preferably 10,000 to 50,000, which are obtainable by reacting a dibasic acid, e.g. terephthalic acid, phthalic acid, isophthalic acid, adipic acid or sebacic acid, a dialkyl ester (e.g. dimethyl ester, etc.) thereof, or a mixture thereof with a glycol such as ethylene glycol, propylene glycol, butylene glycol, diethylene glycol or neopentyl glycol or a mixture thereof in a conventional manner. In the production of such a polyester glycol, use may be made of a conventional esterification or transesterification catalyst or a polymerization catalyst such as antimony dioxide, zinc acetate, lead acetate or manganese acetate.

An epoxy resin may optionally be added to component (A) after the above reaction. The amount of epoxy resin thus optionally added is desirably in the range of 0 to 30 weight percent based on the weight of component (A).

The polyester glycol may be dissolved into an appropriate organic solvent, e.g. ethyl acetate, methyl ethyl ketone, toluene etc. The non-volatile content is within the range of about 10 to 90 weight percent.

The polyester-polyurethane polyol having a molecular weight of 3,000 to 100,000, preferably 10,000 to 50,000, also component (A), can be obtained, for example by reacting a polyester glycol with an organic diisocyanate, if necessary together with a low molecular weight glycol, in such relative amounts as to provide an NCO/OH ratio of 0.7 to 1.0. To conduct this reaction, each molar equivalent of the polyester glycol may be admixed with 0.7 to 1.0 equivalent of the organic diisocyanate or the polyester glycol may be admixed with the low molecular weight glycol in a molar ratio of 0.1 to 1.0 and a sufficient amount of the organic diisocyanate be then added to the blend to provide an NCO/OH ratio of 0.7 through 1.0. A further alternative procedure comprises reacting the polyester glycol or a mixture of the polyester glycol and the low molecular weight glycol with the organic diisocyanate in an NCO/OH ratio of >1 to prepare a prepolymer having isocyanate groups at both terminals and, then, reacting the prepolymer with the low molecular weight polyol inclusive of the low molecular weight glycol or epoxy resin having not less than 2 hydroxyl groups per molecule in sufficient amounts to provide a OH/free NCO ratio of 2 through 20, preferably 4 through 10.

The polyester glycol used in this invention is a linear polyester having hydroxyl groups at both terminals, which is obtainable by reacting one of said dibasic acids with one of said glycols, and preferably has a molecular weight of 500 to 10,000 and, for still better results, 500 to 3,000.

As examples of said organic diisocyanate, there may be mentioned aromatic, aralkyl, aliphatic and alicyclic diisocyanates such as hexamethylene diisocyanate, phenylene diisocyanate, 2,4- or/and 2,6-tolylene diisocyanate, diphenylmethane-4,4'-diisocyanate, 3,3'-dimethyl-4,4'-biphenylene diisocyanate, dicyclohexylmethane-4,4'-diisocyanate, isophorone diisocyanate, lysine diisocyanate, $\omega,\omega'$-diisocyanato-1,3-dimethylbenzene or/and $\omega,\omega'$-diisocyanato-1,4-dimethylbenzene, $\omega,\omega'$-diisocyanato-1,3-dimethylcyclohexane or/and $\omega,\omega'$-diisocyanato-1,4-dimethylcyclohexane and so on. The low molecular weight polyol is preferably such that it contains not less than 2, desirably 2 to 8, hydroxyl groups per molecule and has a molecular weight of not more than 400 and, desirably, 62 to 400. Thus, there may be mentioned such diols as ethylene glycol, diethylene glycol, propylene glycol, 1,4-butylene glycol, neopentyl glycol, 1,6-hexaneglycol, cyclohexane dimethanol, etc.; triols such as glycerin, trimethylolpropane, 1,2,6-hexanetriol, etc.; tetraols and higher polyols such as pentaerythritol, $\alpha$-methyl glucoside, xylitol, sorbitol, sucrose, etc.

The epoxy resin is a reaction product of a polyhydric phenol, e.g. 2,2-bis(4-hydroxyphenyl)propane (bisphenol-A), 1,1,2,2-tetraxis(4-hydroxydiphenyl)ethane, 2,2,5,5-tetraxis(4-hydroxyphenyl)hexane or the like, with a polyfunctional halohydrin such as epichlorohydrin, glycidol or the like.

The above reaction for the preparation of polyester polyurethane polyols is normally conducted at temperatures between 50° and 100° C., either in the presence or without an organic solvent inert to the isocyanate group. If desired, the conventional catalyst used for isocyanate group-hydroxyl group reaction, organotin compound, tertiary amine, etc. may be employed. When the process is carried out in the presence of an organic solvent, it is expedient to employ the organic solvent in a sufficient amount to provide the non-volatile content of the reaction product in the range of about 10 to 90 weight percent and, preferably, about 20 to 80 weight percent.

The said polyester glycol and said polyester-polyurethane polyol may be used as admixed in an optional ratio. The silane coupling agent (B) which is employed in accordance with this invention may be any compound having the structural formula: R-$S_i$≡(X)$_3$ or R-$S_i$≡(R')(X)$_2$ (wherein R is an organic group having a vinyl, epoxy, amino, imino or mercapto group; R' is a lower alkyl group; X is methoxy, ethoxy or chlorine). Thus, for example, chlorosilanes such as vinyltrichlorosilane, imino- or aminosilanes such as N-(dimethoxymethylsilylpropyl)ethylenediamine, aminopropyltriethoxysilane, N-(triethoxysilylpropyl)ethylenediamine, etc.; epoxysilanes such as $\gamma$-glycidoxypropyltrimethoxysilane, $\beta$-(3,4-epoxycyclohexyl)ethyltrimethoxysilane, etc.; vinylsilanes such as vinyltriethoxysilane, vinyltris($\beta$-methoxyethoxy)silane, etc. may be mentioned.

The silane coupling agent may be dissolved into an appropriate organic solvent, e.g. ethyl acetate etc.

The silane coupling agent is particularly useful for the purpose of ensuring an improved bonding affinity for a metal foil or plastic film and an excellent resistance to oils, acids and foodstuffs.

The said silane coupling agent may be admixed and reacted with the polyester glycol at the start of the isocyanate group-hydroxyl group reaction, or may be added during or after the polyurethane formation.

The relative amount of silane coupling agent, based on component (A), is in the range of 0.05 to 30 weight percent and, preferably, 0.1 to 10 weight percent. However, if a silane coupling agent having an active hydrogen group reactive to the isocyanate group is added at the start or during the polyurethane formation, it is necessary to ensure that, inclusive of the active hydrogen group in the silane coupling agent, the NCO/(OH plus active hydrogen) will be 0.7 through 1.0.

As examples of said organic polyisocyanate, there may be mentioned polyisocyanate monomers inclusive of the organic di-isocyanate used as the material for said component (A) and the polyurethane polyisocyanate obtainable by reacting such a polyisocyanate monomer with a low molecular weight polyol also used as a starting material for component (A).

The NCO/OH ratio for the reaction of the polyisocyanate monomer with the low molecular weight polyol is not less than 1.5, normally in the range of 1.5 to 10 and preferably in the range of 1.7 to 5. This reaction is normally conducted at about 30° to 100° C. and in the presence or absence of an isocyanate-inert solvent. If desired, this reaction is conducted in the presence of an organo-metallic catalyst or tertiary amine catalyst. The reaction may be conducted at an increased temperature to produce allophanates or a small amount of water or an amine (e.g. ethylenediamine, hexamethylenediamine, etc.) may be added to the reaction mixture to produce biurets. When an isocyanate-inert solvent is employed, it is advantageous to ensure that the non-volatile content in the product polyurethane-polyisocyanate slurry will be 50 to 90 weight percent.

The adhesive composition according to this invention is produced by admixing component (A) the polyester glycol or polyester-polyurethane polyol prepared as above, component (B) a silane coupling agent and component (C) an organic polyisocyanate in an NCO/active hydrogen ratio of 1 through 10 and, preferably, 1.5 through 7.

To prepare laminations with the aid of an adhesive composition according to this invention, any known process may be employed. For example, the adhesive composition is applied to the film or metal foil by means of a dry laminator, the solvent is evaporated, the mating surfaces are joined and the composition is cured at atmospheric or elevated temperature.

The amount of the adhesive composition to be applied to the film or metal foil is within the range of about 1 g/m$^2$ to about 10 g/m$^2$.

Industrial Applicability

As will be apparent from the test example given hereinafter, the adhesive composition provides a very firm bond which is resistant to dry heat and hot water between a metal foil such as an aluminum foil and a plastic film such as polyethylene, polypropylene, nylon or polyethylene terephthalate film, and packaging materials prepared by the use of the adhesive composition are not affected by food-simulating solvents. Hence, the packaging materials thus prepared, even when they are filled with foods in sealed relation and subjected to hot-water sterilization treatment, do not have the problem of delamination between the metal foil and plastic film, which ensures the long shelf lives for foodstuffs as well as improved tolerance to foodstuffs.

Best Mode for Carrying Out the Invention

The following examples are given to illustrate this invention in further detail.

EXAMPLE 1

(1) A mixture of 194.2 g. of dimethyl terephthalate, 2.48 g. of ethylene glycol, 0.14 g. of antimony trioxide and 0.2 g. of zinc acetate was reacted at 160°–220° C. in nitrogen gas streams for transesterification. After distilling off the methanol to some extent, 202.3 g. of sebacic acid was added and the esterification reaction was conducted at 220°–230° C. The reaction system was gradually decompressed and the condensation reaction was allowed to take place at 230°–260° C. for 30 minutes. Then, the poly-condensation reaction was carried out at 270°–275° C. and under a vacuum of 0.1 to 0.2 mmHg for 2 hours, whereupon a polyester glycol having a molecular weight of approximately 20,000 was obtained. A 100 g. portion of the polyester thus obtained was dissolved in 100 g. of a 1:1 (by wt.) mixture of toluene and methyl ethyl ketone to obtain a slurry having a non-volatile content of 50%. (polyester glycol I)

(2) By a procedure similar to that used in the production of polyester glycol I, there was obtained a polyester glycol having a molecular weight of 40,000 (dimethyl terephthalate/sebacic acid = 1/1 (mol ratio), and ethylene glycol/1,4-butylene glycol = 1/1 (mol ratio)). A 100 g. portion of the polyester glycol thus obtained was dissolved in 100 g. of a 1:1 (by weight) mixture of toluene and methyl ethyl ketone. (polyester glycol II)

(3) A mixture of 215 g. of a polyester glycol (dimethyl terephthalate-sebacic acid-ethylene glycol (mol. weight 2150, dimethyl terephthalate-sebacic acid = 1:1 (mol. ratio)), 17.4 g. of tolylene diisocyanate (2,4-/2,6-=80/20), 240.6 g. of methyl ethyl ketone-toluene (1:1) and, as the catalyst, 0.05 g. of dibutyltin dilaurate was reacted at 60° C. for 4 hours and, then, following addition of 3.5 g. of trimethylolpropane, the reaction was conducted for 2 hours. By the above procedure there was obtained a polyurethane polyol having a nonvolatile content of 50%. (polyester-polyurethane polyol III)

(4) A mixture of 950 g. of a polyester glycol (dimethyl terephthalate/sebacic acid = 1:1 (mol. ratio); ethylene glycol/1,4-butylene glycol = 1:1 (mol. ratio)), (mol. weight 1,900), 87.1 g. of tolylene diisocyanate (2,4-/2,6-=80:20), 1055 g. of a solvent mixture (1:1 by weight) of methyl ethyl ketone and toluene and, as the catalyst, 0.2 g. of dibutyltin dilaurate was reacted at 60° C. for 4 hours and, following addition of 17.9 g. of trimethylolpropane, the reaction was further conducted for 2 hours. By the above procedure there was obtained a polyurethane polyol having a non-volatile content of 50%. (polyester-polyurethane polyol IV)

(5) A mixture of 174.2 g. of tolylene diisocyanate and 73.0 g. of ethyl acetate was heated to 65° C. and 44.7 g. of trimethylolpropane was gradually added. The reaction was conducted for 3 hours to obtain a polyurethane polyisocyanate having a non-volatile content of 75% and containing 14.4 weight % of NCO. (polyisocyanate V)

(6) A mixture of 479 g. of a polyester glycol (isophthalic acid-sebacic acid-neopentyl glycol-ethylene glycol (mol. weight 2,500, isophthalic acid-sebacic acid = 1:1 (mol. ratio), neopentyl glycol-ethylene glycol = 3:1 (mol. ratio)), 33.4 g. of tolylene diisocyanate (2,4-/2,6-=80/20), 522 g. of ethyl acetate and, as the catalyst, 0.1 g. of dibutyltin dilaurate was reacted at 60° C. for 5 hours and, then, following addition of 9.1 g. of diethylene glycol, the reaction was further conducted for 2 hours. By the above procedure, there was obtained a polyurethane polyol having a non-volatile content of 50%. (polyester-polyurethane polyol VI)

(7) By a procedure similar to that used in the production of polyester glycol I, there was obtained a polyester glycol having a molecular weight of about 3,600 (dimethyl terephthalate/sebacic acid = 1/1 (mol. ratio), and ethylene glycol/1,2-propylene glycol = 1/1 (mol. ratio)). A 100 g. portion of the polyester glycol thus obtained was dissolved in 100 g. of ethyl acetate. (polyester glycol VII)

(8) A mixture of 194.2 g. of ω,ω'-diisocyanato-1,3-dimethylbenzene and 80 g. of ethyl acetate was heated to 65° C., and 44.7 g. of trimethylolpropane was gradually added thereto.

The reaction was conducted for 4 hours to obtain a polyurethane polyisocyanate having a non-volatile content of 75% and containing 13.2 weight % of NCO. (polyisocyanate VIII)

Polyester glycols, a polyester-polyurethane polyol, an organic polyisocyanate and a silane coupling agent were admixed as shown in Table 1 below to prepare adhesive compositions 1 through 13.

Table 1

| Adhesive composition No. | Polyester glycol | | | Polyester-Polyurethane Polyol | | | Organic Polyisocyanate | | Silane coupling agent | | | | NCO/H ratio |
|---|---|---|---|---|---|---|---|---|---|---|---|---|---|
| | I | II | VII | III | IV | VI | V | VIII | a | b | c | d | |
| This 1 | 100 | | | | | | 10 | | 1 | | | | 3.6 |
| inven- 2 | | | | 100 | | | 10 | | 1 | | | | 1.6 |
| tion 3 | 100 | | | | | | 10 | | | 1 | | | 6.8 |
| 4 | | | | 100 | | | 10 | | | 1 | | | 2.1 |
| 5 | | | | 100 | | | 10 | | | 0.15 | | | 2.1 |
| 6 | | | | 100 | | | 10 | | | 2.5 | | | 2.1 |
| 7 | 50 | | | 50 | | | 10 | | | | 1 | | 3.2 |
| 8 | 50 | | | 50 | | | 10 | | | | | 1 | 2.3 |
| 9 | | 100 | | | | | 10 | | 1 | | | | 5.1 |

Table 1-continued

| Adhesive composi- tion No. | Polyester glycol | | | Polyester- Polyurethane Polyol | | | Organic Polyiso- cyanate | | Silane coupling agent | | | | NCO/H ratio |
|---|---|---|---|---|---|---|---|---|---|---|---|---|---|
| | I | II | VII | III | IV | VI | V | VIII | a | b | c | d | |
| 10 | | | | | 100 | | 10 | | | 1 | | | 1.8 |
| 11 | | | | | | 100 | 10 | | | 0.5 | | | 2.1 |
| 12 | | | | | | 100 | | 10 | | 0.5 | | | 1.9 |
| 13 | | | 100 | | | | 10 | | | 0.5 | | | 1.2 |
| Con- 14 | 100 | | | | | | 10 | | | | | | 6.8 |
| trol 15 | | | | 100 | | | 10 | | | | | | 2.1 |
| 16 | | 100 | | | | | 10 | | | | | | 8.2 |
| 17 | | | | | 100 | | 10 | | | | | | 1.8 |

Note: Silane coupling agent
a N-(Trimethoxysilylpropyl)ethylenediamine
b γ-Glycidoxypropyltrimethoxysilane
c Vinyltriethoxysilane
d γ-Mercaptopropyltrimethoxysilane For control purposes, adhesive compositions 14 through 17 were prepared without a silane coupling agent. With these compositions, tests were preformed for bond strengths with respect to aluminum foil, heat resistance, and resistance to foodstuffs. Extraction test using food-simulating solvents was carried out. The results are summarized in Tables 2, 3 and 4. The testing procedures are as follows.

Test Experiment 1

Peeling Test

Substrates: polyethylene terephthalate film (12μ thick); aluminum foil (9μ thick); cast polypropylene film (60μ thick)

Adhesive composition applied to Substrates: 4-5 g./m²

Curing conditions: 50° C., 5 days

Test samples: Polyethylene terephthalate film was first applied to each of the adhesive compositions as shown in Table 1 by means of a dry laminator, the solvent was evaporated, the mating surface was joined with the surface of aluminum foil. The other surface of aluminum foil was coated with the same adhesive composition by means of a dry laminator, the solvent was evaporated, the mating surface was joined with the surface of cast polypropylene film and the adhesive composition thus applied was cured.

Test samples were cut into pieces of 200 mm×25 mm. On thest test pieces, T-peel tests were conducted after the test method of ASTM D 1876-61 by using a Tensile testing machine at a loading rate of 300 mm/min. Peel strength (g/25 mm) between the layers of cast polypropylene film and aluminum foil was shown in terms of an average of 10 test pieces.

Heat- and food-resistance test

The respective pouches having a multilayer structure of polyethylene terephthalate film-adhesive composition-aluminum foil-adhesive composition-cast polypropylene film were prepared in a similar manner to that of test samples used in peeling test.

The pouches were filled with meat sauce, so that the inner surfaces of the pouches, i.e., the surfaces of cast polypropylene films came into contact with meat sauce. After each pouch was sterilized with hot water at 135° C. and at a pressure of 3.8 kg/cm² for 20 minutes, the pouches were investigated for signs of delamination between the aluminum foil and polypropylene film, the bond strength and the signs of delamination after storage at 45° C. for 30 days.

This test was performed with ten pouches.

Extraction Test

Extraction test was carried out with pouches of the same type (pouch (I)) as used in heat- and food-resistance test and those of such type as made of cast polypropylene film only (pouch (II)).

Both types of the pouches were filled with the following extraction solvents in a fill ratio of 3.70 ml/in² and retorted and stored under the following conditions.

| Solvents | Retort conditions | Storing conditions |
|---|---|---|
| Water | 250° F. 2 hrs. | 120° F. 3 days |
| 3% Acetic acid | 212° F. 2 hrs. | 120° F. 3 days |

After the above operation, extraction solvents were evaporated and the non-volatile residues (the extraction residues) were weighed.

The extraction residues were separated into chloroform-soluble and-insoluble fractions by extraction of the above non-volatile residues with chloroform.

This test was performed with five samples each of the respective types of pouches.

Table 2

| Adhesive composition No. | Peel strength (average) | Heat- and food- resistance test | | Shelf life at 45° C. |
|---|---|---|---|---|
| | | Peel strength (average) | Defoliation | |
| This | 1 | 1500 | 1400 | No delamination | No delamination |
| inven- | 2 | 2000 | 2100 | No delamination | No delamination |
| tion | 3 | 1800 | 1900 | No delamination | No delamination |
| | 4 | 2500 | 2200 | No delamination | No delamination |
| | 5 | 1900 | 2000 | No delamination | No delamination |
| | 6 | 2600 | 2300 | No delamination | No delamination |
| | 7 | 1800 | 1800 | No delamination | No delamination |
| | 8 | 2000 | 1950 | No delamination | No delamination |
| | 9 | 2200 | 2100 | No delamination | No delamination |

Table 2-continued

| Adhesive composition No. | Peel strength (average) | Heat- and food-resistance test Peel strength (average) | Defoliation | Shelf life at 45° C. |
|---|---|---|---|---|
| 10 | 2500 | 2400 | No delamination | No delamination |
| 11 | 1900 | 1900 | No delamination | No delamination |
| 12 | 1800 | 1700 | No delamination | No delamination |
| 13 | 1550 | 1420 | No delamination | No delamination |
| Control 14 | 1000 | 300 | Partial delamination | Complete delamination |
| 15 | 1200 | 500 | Partial delamination | Complete delamination |
| 16 | 1000 | 550 | Partial delamination | Complete delamination |
| 17 | 1100 | 650 | Partial delamination | Complete delamination |

Table 3

The average amounts of the extraction residues

| Solvents | Adhesive composition No. | This invention 4 | Control 14 |
|---|---|---|---|
| Water | Pouch (I) | 0.0037 mg/in² | 0.056 mg/in² |
|  | Pouch (II) | 0.0014 | −0.0010 |
|  | net adhesive extract | 0.0023 | 0.057 |
| 3% Acetic acid | Pouch (I) | 0.0139 | 0.0455 |
|  | Pouch (II) | 0.0111 | 0.0005 |
|  | Net adhesive extract | 0.0028 | 0.0450 |

Table 4

The average amounts of the chloroform soluble fractions

| Solvents | Adhesive composition No. | This invention 4 | Control 14 |
|---|---|---|---|
| Water | Pouch (I) | 0.0014 mg/in² | 0.0555 mg/in² |
|  | Pouch (II) | 0.0009 | 0.0010 |
|  | net adhesive extract | 0.0005 | 0.0545 |
| 3% Acetic acid | Pouch (I) | 0.0023 | 0.0445 |
|  | Pouch (II) | 0.0018 | 0.0005 |
|  | net adhesive extract | 0.0005 | 0.0440 |

We claim:

1. An adhesive composition for plastic-metal foil composite packaging materials which comprises (A) a polyester glycol having a molecular weight of 3,000 to 100,000, a polyester-polyurethane polyol having a molecular weight of 3,000 to 100,000 or a mixture thereof, (B) a silane coupling agent and (C) an organic polyisocyanate, the molar equivalent ratio (NCO/H) of isocyanate group (NCO) to active hydrogen (H) thereof being within the range of 1 to 10.

2. An adhesive composition claimed in claim 1, the molar equivalent ratio of isocyanate group to active hydrogen is within the range of 1.7 to 7.

3. An adhesive composition claimed in claim 1, the relative amount of the silane coupling agent (B), based on component (A), is within the range of 0.05 to 30 weight percent.

4. An adhesive composition claimed in claim 1, the relative amount of the silane coupling agent (B), based on component (A), is within the range of 0.1 to 10 weight percent.

5. An adhesive composition claimed in claim 1, the silane coupling agent (B) is a compound having the structural formula: $R-Si\equiv(X)_3$ or $R-Si\equiv(R')(X)_2$ (wherein R is an organic group having a vinyl, epoxy, amino, imino or mercapto group; R' is a lower alkyl group; X is methoxy, ethoxy or chlorine).

6. An adhesive composition claimed in claim 5, wherein the compound has the structural formula: $R-Si\equiv(X)_3$ (wherein R is an organic group having an imino group and X is methoxy).

7. An adhesive composition claimed in claim 5, wherein the compound has the structural formula: $R-Si\equiv(X)_3$ (wherein R is an organic group having an epoxy group and X is methoxy).

* * * * *